(12) United States Patent
Eidam

(10) Patent No.: US 7,507,049 B2
(45) Date of Patent: Mar. 24, 2009

(54) LOCKING RING

(75) Inventor: Frank Eidam, Bad Camberg (DE)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 10/699,902

(22) Filed: Nov. 3, 2003

(65) Prior Publication Data

US 2004/0253050 A1 Dec. 16, 2004

Related U.S. Application Data

(60) Provisional application No. 60/478,224, filed on Jun. 13, 2003.

(51) Int. Cl.
*F16B 21/00* (2006.01)

(52) U.S. Cl. ........................ 403/315; 411/521

(58) Field of Classification Search ............... 403/315, 403/329, 155, 154, 316, 317, 319, 397, 379.2; 411/526, 520, 521, 525
See application file for complete search history.

(56) References Cited

U.S. PATENT DOCUMENTS

| | | | | |
|---|---|---|---|---|
| 2,275,058 A | * | 3/1942 | Draving | 411/521 |
| 2,975,667 A | * | 3/1961 | Bross | 411/521 |
| 3,408,095 A | * | 10/1968 | Moore | 285/110 |
| 4,364,615 A | * | 12/1982 | Euler | 384/517 |
| 5,713,692 A | * | 2/1998 | McCarrick et al. | 403/329 |
| 6,390,925 B1 | * | 5/2002 | Perrow | 464/111 |
| 2003/0029689 A1 | | 2/2003 | Angione | |

FOREIGN PATENT DOCUMENTS

| | | |
|---|---|---|
| DE | 801851 | 9/1958 |
| DE | 19961709 A1 * | 7/2001 |
| DE | 19961709 A1 | 12/2001 |
| FR | 2821906 A1 * | 9/2002 |
| GB | 801851 | 9/1958 |
| JP | 63-130906 | 11/1986 |
| JP | 63-130908 A | 6/1998 |
| WO | WO 02/14705 A1 | 2/2002 |

OTHER PUBLICATIONS

International Search Report- PCT/IB2004/001899.

* cited by examiner

*Primary Examiner*—James R Brittain
(74) *Attorney, Agent, or Firm*—Fay Sharpe LLP; Karl W. Hauber

(57) ABSTRACT

A closed locking ring for a shaft, a shaft stub or a bore having a locking groove therein. The locking ring can include a closed edge zone and a circumferentially interrupted engagement zone, wherein the circumferentially interrupted engagement zone is proximal to the locking groove and the closed edge zone is distal from the locking groove. The interrupted engagement zone slants towards the axis of the locking ring a sufficient amount to allow axial movement of the locking ring into the position of the locking groove.

17 Claims, 10 Drawing Sheets

LOCKING RING

The present invention claims priority of Provisional Application Ser. No. 60/478,224, filed Jun. 13, 2003.

The present invention relates to the field of locking devices, and more particularly to a locking ring to facilitate in the fastening of a needle bearing to a shaft (axle), a shaft stub, a bore and the like.

BACKGROUND OF THE INVENTION

Locking rings are used in a large field of applications, where parts have to be fixed on a shaft, a shaft stub or within a bore which can be provided in any type of material body. At present two general types of locking rings are known. The first type is circumferentially open. This general type is used in connection with a locking groove on the shaft or in the bore and is adapted to the dimensions of the groove, i.e. with respect to its width and its diameter in the mounted state. The locking ring includes a circumferential gap and gripping elements. The gripping elements enable closing and opening of the gap by the use of a corresponding tool which intermediately changes the general diameter of the locking ring by changing its circumferential length. Opening the gap allows the locking ring to be elastically deformed and moved into its final axial position close to the locking groove. Releasing the elastically deformed locking ring thereafter, will return the locking ring, via its spring forces, back into the direction of its "natural" diameter and thereby penetrate the locking groove to the maximum possible extent without further action by the tool or the like. One version of these types of locking rings, known as circlips, do not include a gripping area (elements) and thus do not require the use of a corresponding tool to elastically deform the locking ring.

The other general type of locking ring is circumferentially closed. Located inwardly or outwardly of the circumferentially closed edge zone are a number of equally spaced teeth. The teeth extend inwardly or outwardly, and make physical contact with the shaft or bore on which these so called tooth rings, or self locking rings, are to be placed. The teeth need to be rather elastically deformable and particularly adapted to the diameter of the shaft or bore for which the locking ring is to be used, because the teeth must be bent elastically in order to be pushed axially to their final position on the shaft or in the bore. It is possible to further move the locking ring in the axial direction even after mounting of the locking ring at least in one of two axial directions, since the teeth remain bent elastically during the whole period of their application to the shaft or bore. This holds true, even if the teeth can elastically snap into a locking groove which may be provided on the shaft or in the bore. The degree of security of axial holding force and the accuracy of the holding position of this general type of locking ring is rather limited.

For both of the aforementioned general types of locking rings, a material with a considerable spring force is needed, for instance hardened steel and particularly so called spring steel.

The first type of locking ring, being circumferentially open and having a gap, can be used to withstand considerable axial forces after being mounted. The second type of locking ring, being circumferentially closed, can be easily mounted but withstands—at least in one direction—relatively smaller axial forces while being mounted. In either case, it is necessary to make these types of locking rings with considerable "spring" properties and to ensure very precise dimensions in connection with the shaft or bore to which these locking rings are applied.

It is often necessary to provide a support washer which is axially placed next to the mounted locking ring in order to keep larger parts or groups of parts in a predetermined axial position with respect to the shaft or the bore. Typical applications include needle bearings where the needles roll along the circumference of a shaft, and where the needles must be kept in their axial position in a simple and space conserving manner. Other applications include certain types of gears, e.g. multi shaft gear rings or swivels.

Therefore, there is a need for an improved type of locking ring which is not only easy to manufacture, but also enables simple mounting of such locking rings, while exhibiting sufficiently high axial holding forces.

SUMMARY OF THE INVENTION

The present invention is directed to a locking ring to facilitate in the fastening of a needle bearing to a shaft (axle), a shaft stub, a bore and the like, and even more particularly to an improved circumferentially closed locking ring which allows for a simplified mounting of the locking ring in a locking groove provided in the circumference of the shaft, the shaft stub or the bore for positioning, i.e. inextricably fixing, of the locking ring, and will be described with particular reference thereto; however, it will be appreciated that the locking ring of the present invention has broader applications and can be used to facilitate in the connecting or securing of many or devices.

In accordance with the present invention, there is provided a circumferentially closed locking ring. The locking ring is particularly designed for use with a shaft, a shaft stub, a bore, and the like having a locking groove. After the locking ring has been installed, the locking ring includes an outer (or respectively of an inner) closed edge zone which slants toward the axis of the locking ring, and a radially inner (or respectively a radially outer) circumferentially interrupted engagement zone which slants toward the axis of the locking ring. In one embodiment of the invention, the slant of the radially inner circumferentially interrupted engagement zone has a smaller angle than the outer closed edge zone. The differing slant angles facilitate in the locking action of the locking ring. In one aspect of this embodiment, radially inner circumferentially interrupted engagement zone has an angle that is at least about 0.5° less than the outer closed edge zone, and typically at least about 1° less, and still typically is about 1°-50° less, and more typically is about 2°-30° less, and even more typically is about 4°-20° less. As can be appreciated other angle differences can be utilized. In another and/or alternative embodiment of the invention, the slant of the radially inner circumferentially interrupted engagement zone is substantially the same as the outer closed edge zone. In still another and/or alternative embodiment of the invention, the slant of the radially inner circumferentially interrupted engagement zone has a greater angle than the outer closed edge zone. The differing slant angles facilitate in the locking action of the locking ring. In one aspect of this embodiment, radially inner circumferentially interrupted engagement zone has an angle that is at least about 0.5° greater than the outer closed edge zone, and typically at least about 1° greater, and still typically is about 1°-50° greater, and more typically is about 2°-30° greater, and even more typically is about 4°-20° greater. As can be appreciated other angle differences can be utilized. In yet another and/or alternative embodiment of the invention, the combined angle of deflection of the two zones is generally at least about 2°, and typically at least about 5°, and more typically at least about 10°, and still more typically about 10°-75°, and yet more typically about 12-60°, and even more typically about 15°-45°. As can be appreciated other combined deflection angles can be utilized.

In accordance with another and/or alternative aspect of the present invention, a device having a locking groove is provided wherein the diameter of the device is larger on one side of the groove than on the other side so that an abutment or shoulder for a locking ring having an engagement zone is created. In one embodiment of the invention, at least a portion of the engagement zone of the locking ring can be permanently (i.e. plastically) deformed. The device includes, but is not limited to, a shaft, a shaft stub or a bore.

In accordance with still another and/or alternative aspect of the present invention, a method for at least partially connecting the device with a locking groove to a locking ring is provided, wherein after installation, the locking ring includes an outer (or respectively of an inner) closed edge zone which slants toward the axis of the ring, and a radially inner (or respectively a radially outer) circumferentially interrupted engagement zone which slants toward the axis of the ring at a smaller, equal or larger angle than the closed edge zone. The locking ring can be brought approximately into the position of the groove, and the interrupted engagement zone can be at least partially plastically bent by a permanent, i.e. generally inelastic, deformation action toward the axis of the ring, so that at least the radially inner (or respectively the radially outer) tips of the inward (or respectively the outward) engagement zone engage in the groove.

In accordance with yet another and/or alternative aspect of the present invention, a method is described in which a deforming tool, which can be placed on a closed edge zone of a locking ring or on certain parts thereof, is used, which tool supports at least the radially outer (or respectively the radially inner) area of an outer (or respectively of an inner) edge zone during the deformation process of the locking ring and exerts a deformation movement in the direction coaxial to the axis of the locking ring in such a way that an engagement zone of the locking ring, at least part of which is seated on an abutment, can be at least partially permanently deformed toward the axis of the ring to a greater degree than the closed edge zone of the locking ring.

In accordance with still yet another and/or alternative aspect of the present invention, the locking ring can be formed as "cupped" locking rings having a circumferentially closed edge zone or edge portion at the inside or outside thereof respectively, and having a circumferentially interrupted engagement zone being radial outward or inside of the closed edge zone respectively. The "active" diameter of the interrupted engagement zone, i.e. the diameter which is closest to the shaft or bore and the respective locking groove, can be after manufacturing of the locking ring (due to sufficient inclination of the interrupted engagement zone with respect to its axis) sufficient to allow an axial displacement of the locking ring along the shaft or bore to its intended axial position without excessive force. Deformation of the inclined teeth of the interrupted engagement zone at least partially plastically into the locking groove can thereby change the "active" diameter of the locking ring which provides for engagement of the locking groove due to reduction of the inclination of the interrupted engagement zone with respect to its axis.

In accordance with a further and/or alternative aspect of the present invention, a closed locking ring is provided for a shaft, a shaft stub or a bore having a locking groove therein. The locking ring has a closed edge zone and a circumferentially interrupted engagement zone, wherein the circumferentially interrupted engagement zone is proximal to the locking groove and the closed edge zone is distal from the locking groove. The interrupted engagement zone slants towards the axis of the locking ring a sufficient amount to allow axial movement of the locking ring into the position of the locking groove. At least the tip portion of the circumferentially interrupted engagement zone is bendable towards the axis of the locking ring in order to enter the locking groove by changing the active diameter of the circumferentially interrupted engagement zone from a first diameter to a second diameter.

One object of the present invention is to provide a locking ring that is not required to be formed of a material having considerable spring force.

Another and/or alternative object of the present invention is to provide a locking ring that is easy to manufacture.

Still another and/or alternative object of the present invention is to provide a locking ring that enables simple mounting.

Yet another and/or alternative object of the present invention is to provide a locking ring that exhibits high axial holding forces.

Still yet another and/or alternative object of the present invention is to provide a locking ring that can be used to facilitate in the fastening of a needle bearing to a shaft (axle), a shaft stub, a bore and the like.

Still a further and/or alternative object of the present invention is to provide a locking ring that includes an outer (or respectively of an inner) closed edge zone which slants toward the axis of the locking ring, and a radially inner (or respectively a radially outer) circumferentially interrupted engagement zone which slants toward the axis of the locking ring.

Yet a further and/or alternative object of the present invention is to provide a device that is used to form the outer closed edge zone and the radially inner circumferentially interrupted engagement zone of the locking ring.

Still yet a further and/or alternative object of the present invention is to provide a locking ring having an engagement zone that is at least partially permanently (i.e. plastically) deformable.

Still another and/or alternative object of the present invention is to provide a locking ring formed as a "cupped" locking ring having a circumferentially closed edge zone or edge portion at the inside or outside thereof respectively, and having a circumferentially interrupted engagement zone being radial outward or inside of the closed edge zone respectively.

These and other objects and advantages will become apparent from the discussion of the distinction between the invention and the prior art and when considering the preferred embodiment as shown in the accompanying drawings.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DETAILED DESCRIPTION

Figure 1:
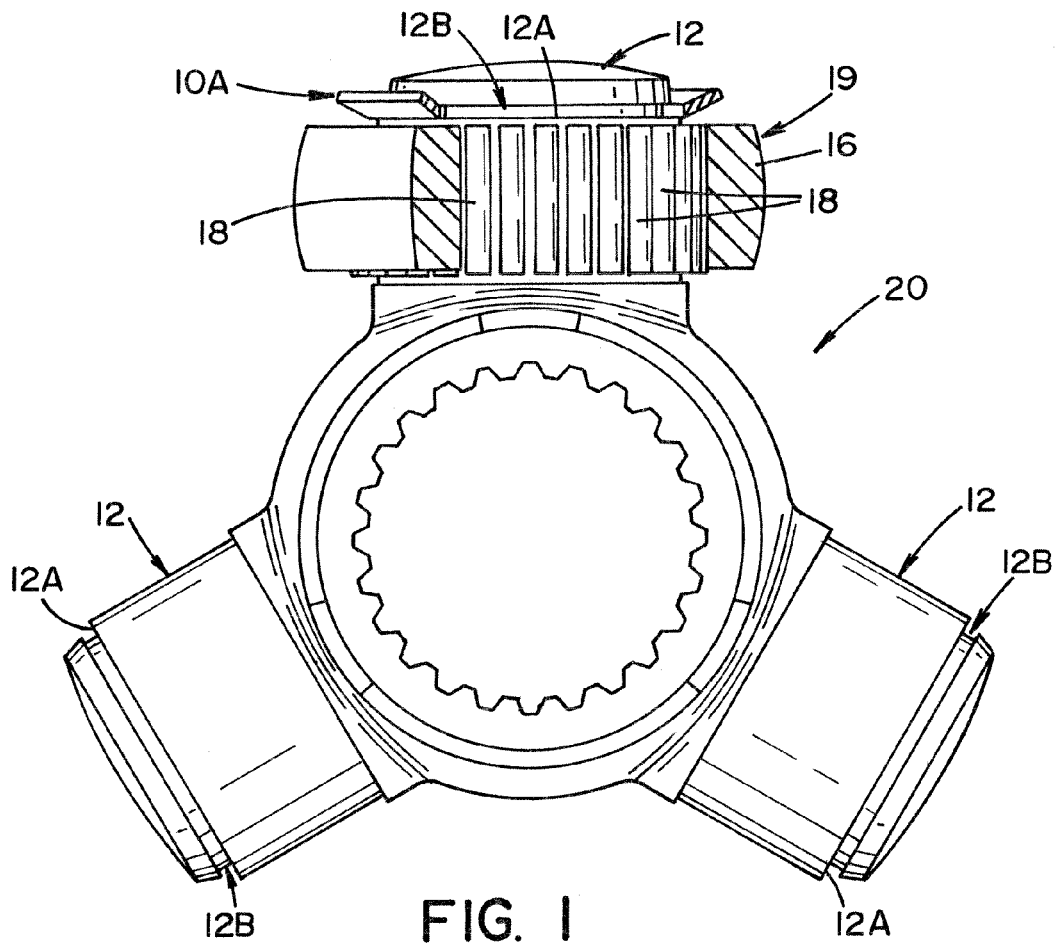
FIG. 1 is a perspective view of an application of a locking ring fastening a needle bearing to a shaft stub according to the present invention.

Referring now in greater detail to the drawings, wherein the showings are for the purpose of illustrating preferred embodiments of the invention only and not for the purpose of limiting the invention, an apparatus and process for fastening, for example, a needle bearing (19), to a shaft, a shaft stub (12), or a bore (14) is provided. A cupped locking ring (10A) is illustrated in FIGS. 1-4B. The locking ring (10A) is circumferentially closed around the outside rim (13) and interrupted on the inside. The locking ring (10A) can be permanently deformed or bent (FIGS. 1, 2 and 4B) by means of a ring shaped die (11) (FIGS. 2 and 4A) and a support shoulder (12A) which is provided on the shaft or shaft stub (12) during the installation/assembly process. The cupping (FIG. 3A to 4A) of the locking ring (10A) or at least of an interrupted engagement zone (10C) during manufacturing before installation, can provide an inclination (I1) of the interrupted engagement zone (10C) with respect to its axis (10E), cupping makes it possible for the locking ring (10A) to have a sufficiently large inside diameter (D2) before it is placed on the shaft (12) and also allows for the inside diameter (D2) of the locking ring (10A) to be reduced by deformation of the interrupted inside zone (10C) in the direction toward the axis (10E) of the ring, i.e. by reduction of inclination (12) with respect to its axis (10E).

FIGS. 1-4B show a closed locking ring (10A) for a shaft stub (12) with a locking groove (12B). After installation/assembly, the locking ring (10A) includes an outer, closed edge zone (10D) which inclines (slants) toward the axis (10E) of the ring, and of a radially inner, circumferentially interrupted engagement zone (10C), which inclines towards the axis (10E) of the locking ring (10A). After deformation, the engagement zone (10C) inclines at a smaller angle relative to the angle of inclination for the closed edge zone (10D).

The closed locking ring (10A) is provided for a shaft or a shaft stub (12) with a locking groove (12B) wherein prior to installation, the locking ring (10A) includes an outer, closed edge zone (10D), which slants toward the axis (10E) of the ring, and a radially inner, circumferentially interrupted engagement zone (10C) which may slant toward the axis of the locking ring at approximately the same angle as the edge zone (10D).

The shaft or shaft stub (12) is provided with a circumferential locking ring (10A) fixed axially in a groove (12B) wherein after installation, the locking ring (10A) includes an outer, closed edge zone (10D), which slants toward the axis (10E) of the ring, and a radially inner, circumferentially interrupted engagement zone (10C), which slants toward the axis (10E) of the ring at a smaller angle than the edge zone 10D. Additionally, the shaft or shaft stub (12) is provided wherein the diameter of the shaft or the shaft stub (12) is larger on one side of the groove (12B) than on the other side, so that an abutment or shoulder (12A) can be created for the engagement zone (10C) which is to be permanently deformed. It is to be appreciated that diameter (D1) of the shaft stub (12) at the one side of the groove (12B) is greater than diameter (D2) of the shaft stub (12) at the other side of the groove (12B) and diameter (D2) is greater than diameter (D3) at the bottom of the groove (12B) (see FIGS. 2 and 4A).

FIG. 1 shows a practical application of locking rings according to the present invention. As can be seen from FIG. 1 a gear or swivel ring (20) is provided with three shaft stubs (12) the axis of which radially extend from the outside of the gear or swivel ring (20) and are spaced at angles of 120° from one another. The shaft stubs (12) which extend in the four o'clock and in the eight o'clock positions show a circumferential locking groove (12B) close to the free end of shaft stub (12). The shaft stub (12) in the twelve o'clock position is already mounted with a needle bearing (19) which is comprised of a large number of bearing needles (18)—shown in a broken away area—positioned side by side around the circumference of shaft stub (12). A roller (16)—being shown partly broken away is running with its inner diameter on the needles (18) for ease of rotation around the corresponding shaft stub (12) with minimal friction. The locking groove (12B) of the shaft stub (12) in the twelve o'clock position is provided with a locking ring (10A) which has a shape and an outer diameter that enables it to hold the needles (18) and the roller (16) on the shaft stub (12) without using a support washer, as can be seen in more detail in FIG. 2.

Figure 2:
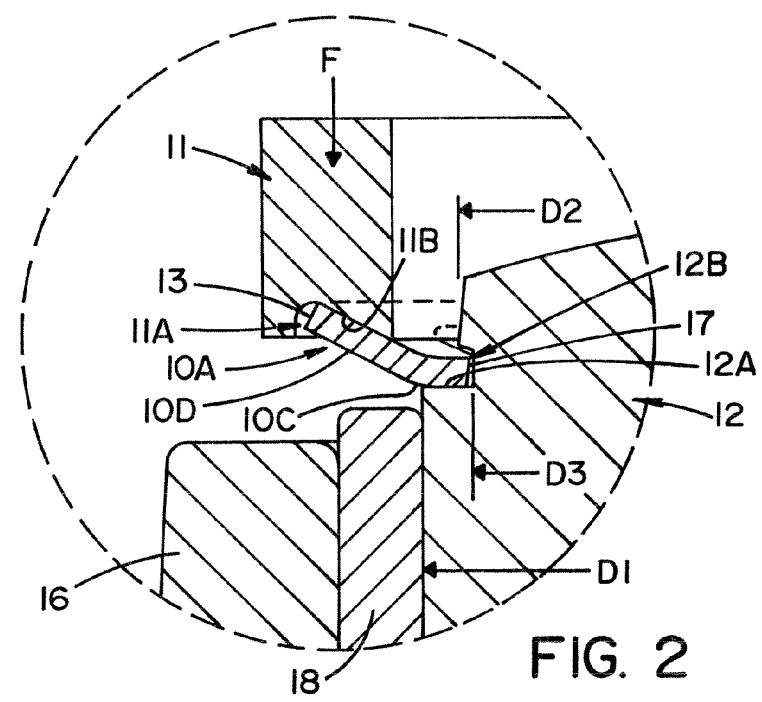
FIG. 2 is an enlarged partial cross-section of the locking ring in FIG. 1 according to the present invention, being put in place and being permanently deformed.

FIG. 2 shows how a deforming tool or die (11) engages a locking ring (10A) during deforming of the interrupted engagement zone (10C) of the locking ring (10A) permanently, i.e. plastically. While the mounting process will be described with respect to the following drawings in more detail, FIG. 2 shows that the deforming tool (11), which may be ring shaped (as shown) or comprised of circumferentially spaced pressing elements (not shown), is provided with a receiving groove (11A) and a shaped pressing shoulder (11B) adjacent to the receiving groove (11A). As shown in FIG. 2, the receiving groove (11A) receives the outer rim (13) of the locking ring (10A) which is circumferentially closed at its outer edge zone (10D). The pressing shoulder (11B) allows for the closed edge zone (10D) of the locking ring (10A) to abut on the pressing shoulder (11B) while a pressing force (F)

is axially applied to the pressing shoulder. This allows a plastically i.e. permanent, deformation of the inner part of the locking ring, i.e. of the interrupted engagement zone (10C), which will be described with the subsequent drawings in more detail.

Turning now to FIGS. 3A to 4B, FIG. 3A shows a locking ring (10A) having the outer closed edge zone (10D) being circumferentially uninterrupted and having radially adjacent thereto an inner interrupted engagement zone (10C) with a plurality of teeth (15) facing inwardly and being circumferentially spaced from one another and about equidistant.

Figure 3A:
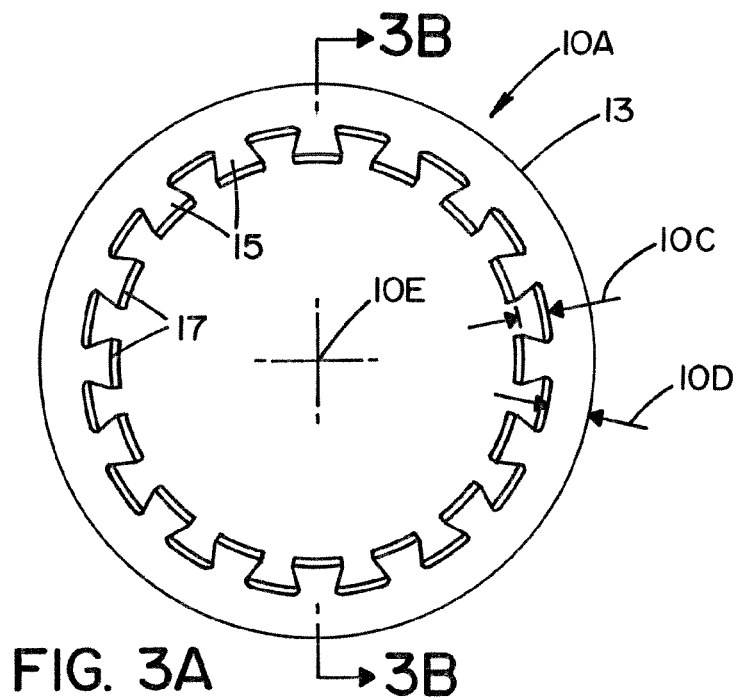
FIG. 3A is a top elevation view of a first embodiment of a cupped locking ring according to the present invention.
Figure 3B:
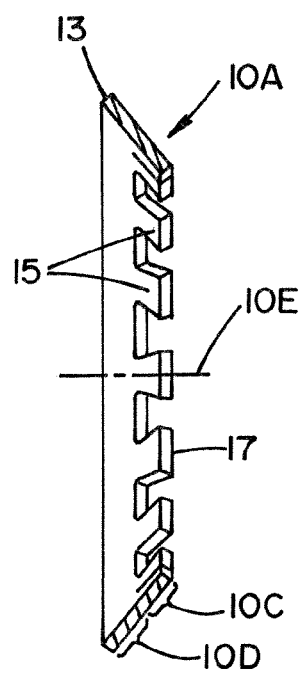
FIG. 3B is a cross-sectional view of the locking ring of FIG. 3A according to the present invention.
Figure 4A:
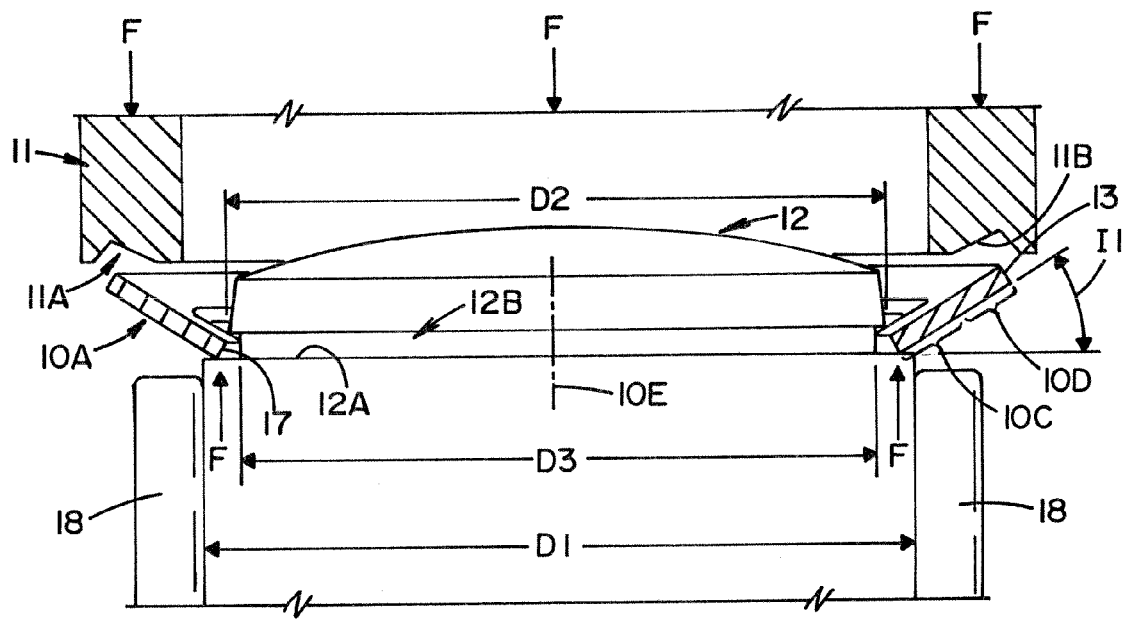
FIG. 4A is an elevation view partially in section of the first embodiment of the cupped locking ring in a first, pre-pressing stage according to the present invention, being put in place but not yet deformed.

As shown in FIGS. 3B and 4A the locking ring (10A) can be "cupped" and comprises the general shape of a frustum which slants towards the axis (10E) of the locking ring (10A) having an overall inclination (I1) of about 35°. However, it will be appreciated that the overall inclination may vary widely, e.g. in the range of about 45° to about 15°.

As can be seen in some more detail in FIG. 4A the outer diameter (D2) of shaft stub head (12) nearly equals the inner diameter of the cupped locking ring (10A) which allows the locking ring (10A) to be pushed, without considerable force, into its working position shown in FIG. 4A. The working position is defined by a circumferential locking groove (12B). The dimensions of the locking groove (12B) are less critical because the locking ring will be deformed plastically, i.e. keeping its shape after the bending process without considerable spring forces remaining active. A support or abutment shoulder (12A) can be provided on the other side of the locking groove (12B) and has dimensions which allow for abutment of the cupped locking ring (10A) close to its inner diameter sufficiently for the subsequent bending process. The bending process involves a deforming tool (11) partially shown in FIG. 4A. The deforming tool (11) may be adapted to the particular situation. Also, if no support or abutment shoulder is provided on the shaft or the shaft stub any comparable abutment tool could be used for the position opposite of deforming tool (11).

Figure 4B:
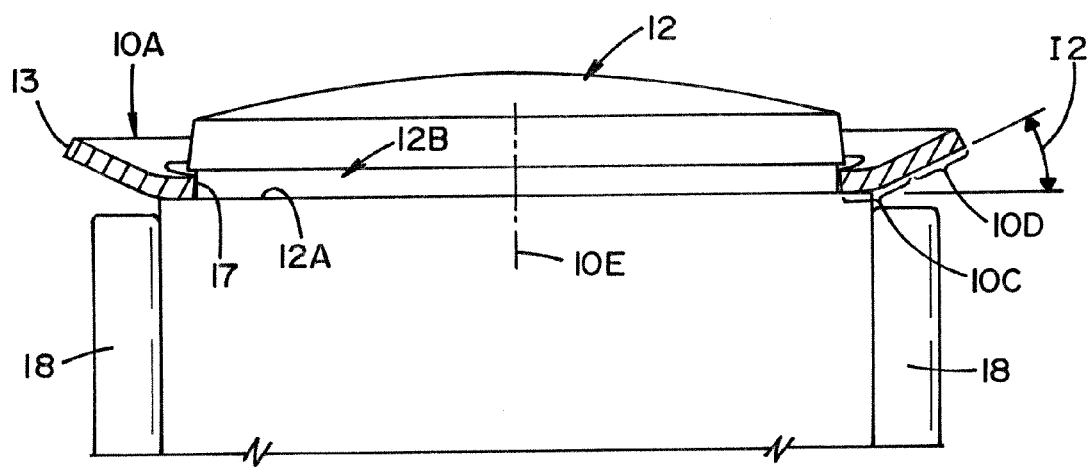
FIG. 4B is an elevation view partially in section of the first embodiment of the locking ring in a second, after-pressing stage, i.e. being permanently deformed according to the present invention.
Figure 5A:
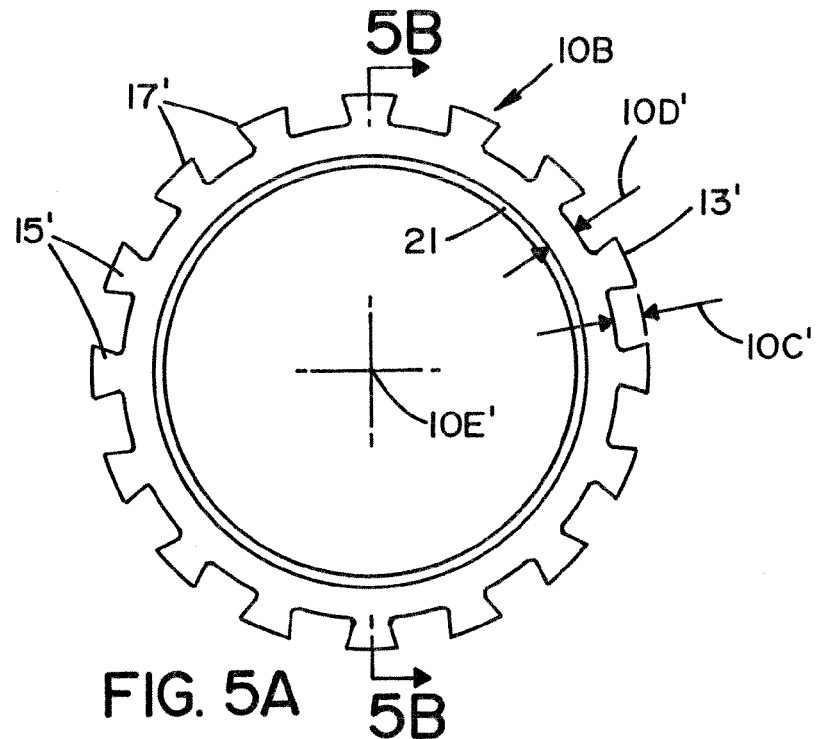
FIG. 5A is a top elevation view of a second embodiment of a cupped locking ring according to the present invention.
Figure 5B:
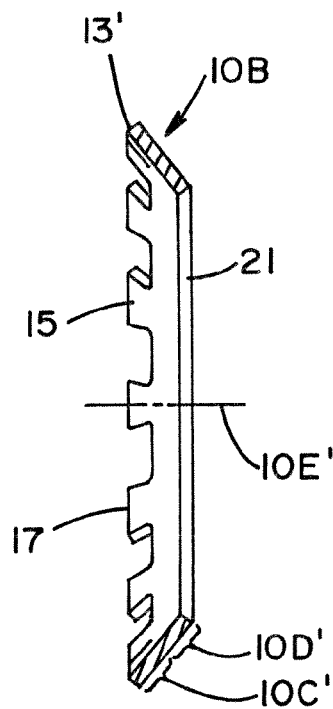
FIG. 5B is a cross-sectional view of the cupped locking ring of FIG. 5A according to the present invention.

As can be seen from FIG. 4B, the locking ring (10A) in its deformed final shape includes a different angle of inclination (I2) with respect to axis (10E) as compared to the shape of the locking ring before its mounting and deforming (as shown in FIGS. 3B and 4A). While the slanting angle (I1) is for example 35° as shown in FIG. 4A for the whole locking ring, this angle may become less, for instance 30° (I2) for the closed edge zone (10D) and may become considerably less for at least the tip part (17) of the teeth (15) of the interrupted engagement zone (10C). Typical slanting angles before mounting may be 15° to 45°. After mounting, the closed edge zone may include slanting angles of 0° to 40° and the tip part (17) of the interrupted engagement zone may include slanting angles of 0° to 20°.

A process for connecting a shaft or a shaft stub (12) to a closed locking ring (10A) is provided which engages in a groove (12B) wherein after installation, the locking ring (10A) includes an outer, closed edge zone (10D), which may slant toward the axis (10E) of the ring, and a radially inner, circumferentially interrupted engagement zone (10C), which can slant toward the axis (10E) of the ring. The locking ring (10A) can then be brought approximately into the position of the groove (12B), and the interrupted engagement zone (10C) is then bent toward the axis (10E) of the ring, so that at least the radially inner tips (17) of the interior engagement zone (10C) engage in the groove (12B). According to this process, a deforming tool (11), which can be placed on the closed edge zone (10D) or on certain parts thereof, is provided, which tool (11) supports at least the free rim area of the closed edge zone (10D) during the deformation process. The tool (11) can exert a deformation movement in the direction coaxial to the axis (10E) of the ring in such a way that the interrupted engagement zone (10C), at least part of which is seated on an abutment (12A), is permanently deformed toward the axis (10E) of the ring eventually to a greater degree than the closed edge zone (10D).

With reference to FIGS. 5A-6B, another embodiment of a cupped locking ring (10B) is illustrated. In this embodiment, like components relative to the ring (10A) are identified with like reference numbers including a single primed (') suffix and new components are identified by new numerals. An inverted solution with a cupped locking ring (10B) having its interrupted engagement zone (10C') at its outer ring area (13') is shown in FIGS. 5A-6B. It is to be appreciated that the cupped locking ring (10B) can provide for the locking principal to be inverted for use on the inner periphery of a bore (14) with the cupped locking ring (10B) having its interrupted engagement zone (10C') at its outer ring area (13') while the uninterrupted closed edge zone (10D') is placed at its inner ring area (21).

Figure 6A:
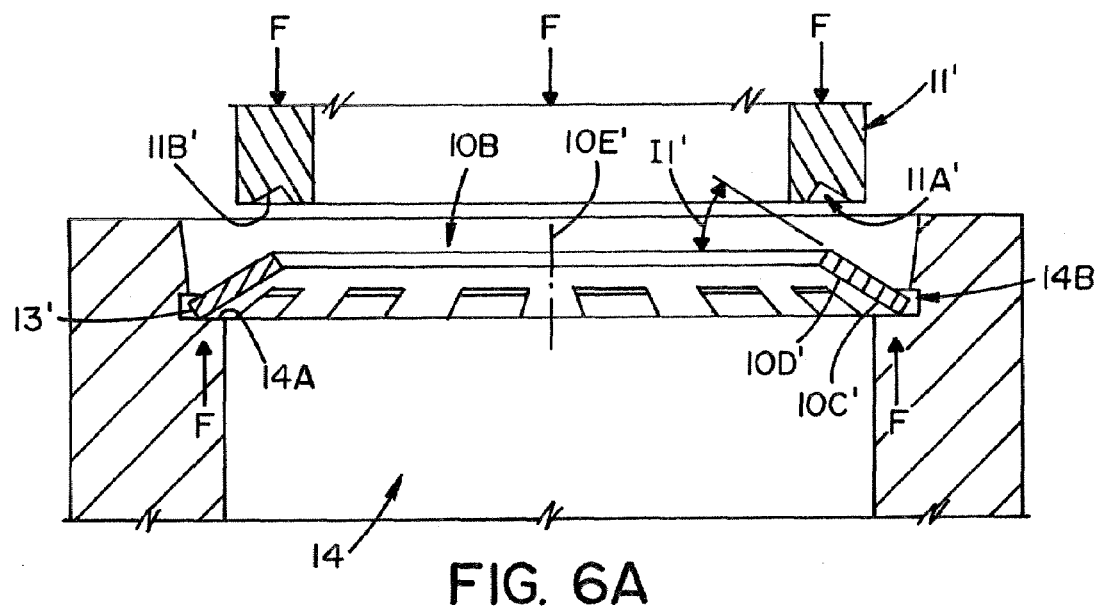
FIG. 6A is an elevation view partially in section of the second embodiment of the cupped locking ring according to the present invention, being put in place but not yet deformed.
Figure 6B:
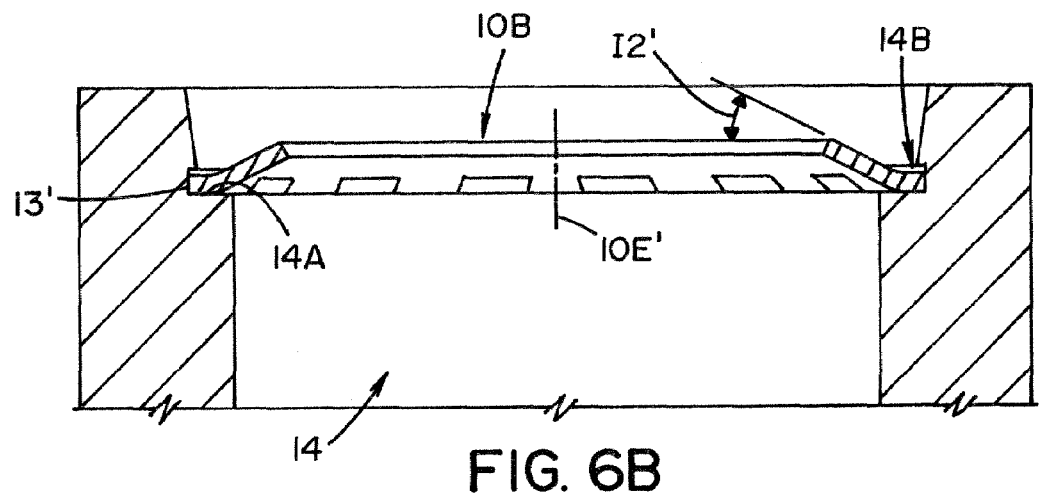
FIG. 6B is an elevation view partially in section of the second embodiment of the locking ring according to the present invention after deformation.

In other words, the product, system and process of the embodiment according to FIGS. 3A to 4B can be inverted for use of locking rings (10B) in a bore (14) having a locking groove (14B) at its circumference and a support or abutment shoulder (14A) which allows mounting of the locking ring (10B) using only one deforming tool (11'). The deforming tool (11'), which can be ring shaped, is provided with a receiving groove (11A') and a shaped pressing shoulder (11B') adjacent to the receiving groove (11A') as shown in FIG. 6A, the receiving groove (11A') receives the inner ring (21) of the locking ring (10B) which is circumferentially closed at its inner edge zone (10D'). The pressing shoulder (11B') allows for the closed edge zone (10D') of the locking ring (10B) to abut on the pressing shoulder (11B') while a pressing force (F) is axially applied to the pressing shoulder. This allows a plastic deformation of the outer part of the locking ring, i.e. of the interrupted engagement zone (10C'). The deforming tool (11') can bend at least part of the interrupted engagement zone (10C') of locking ring (10B) in the same way as with respect to the first embodiment but outwardly so that the outer diameter of the locking ring (10B) becomes enlarged and the tips (17') of the engagement teeth (15') enter the locking groove (14B) due to plastic deformation of the locking ring (10B) within the interrupted engagement zone (10C'). Also in this embodiment, the slanting angle (I1') of the closed edge zone (10D') of locking ring (10B) with respect to the axis (10E') will diminish a bit (I1' to I2') under the plastically deforming action.

Figure 7:
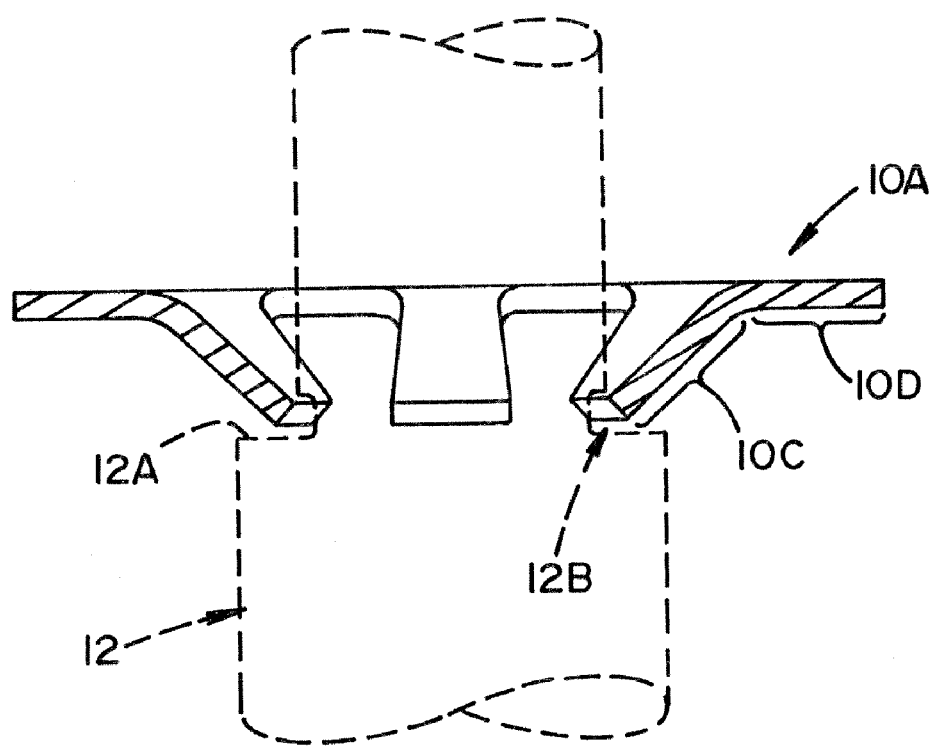
FIG. 7 is another embodiment of a cupped, circumferentially closed locking ring in a sectional view showing the locking ring in its provided position on a shaft, but not yet being deformed (bent) to enter the locking groove in the shaft.
Figure 8A:
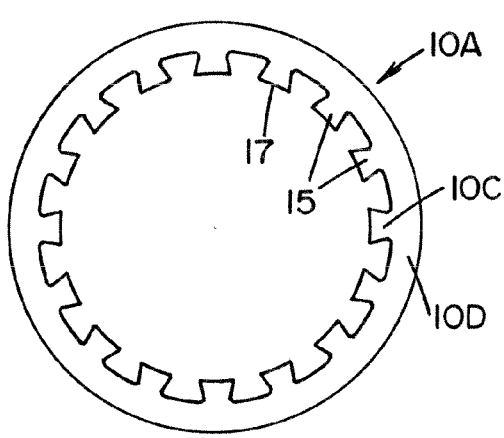
FIGS. 8A-8F show various embodiments of locking rings in an elevational view, wherein the locking rings include differently shaped, radially inner, interrupted engagement zones.
Figure 8B:
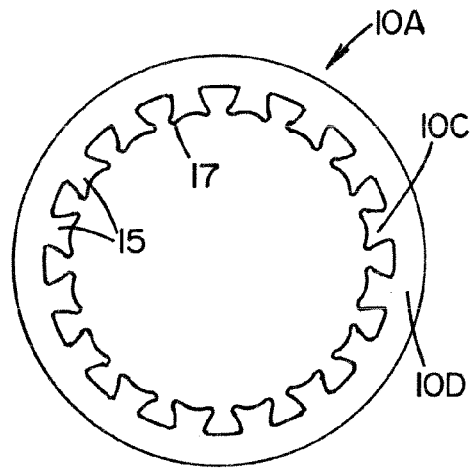
Figure 8C:
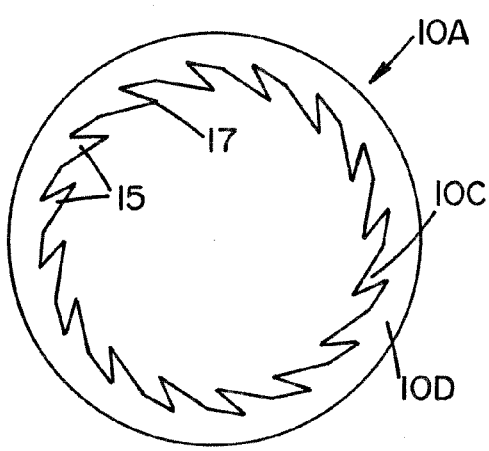
Figure 8D:
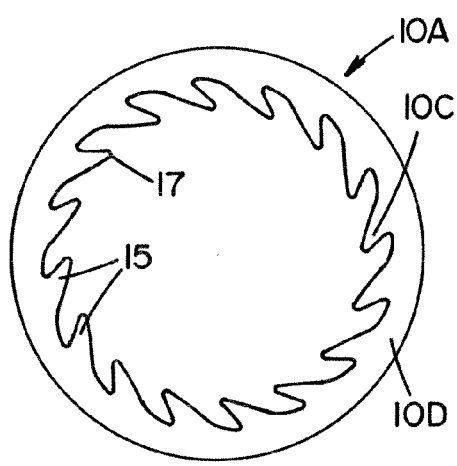
Figure 8E:
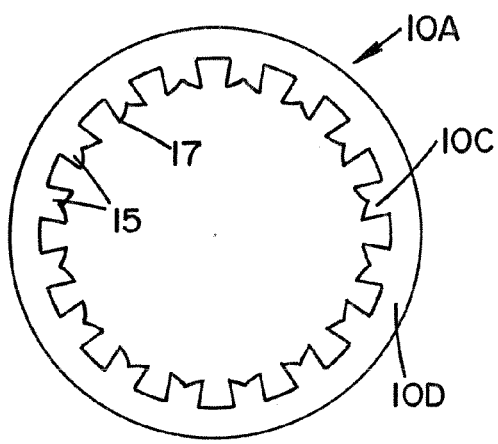
Figure 8F:
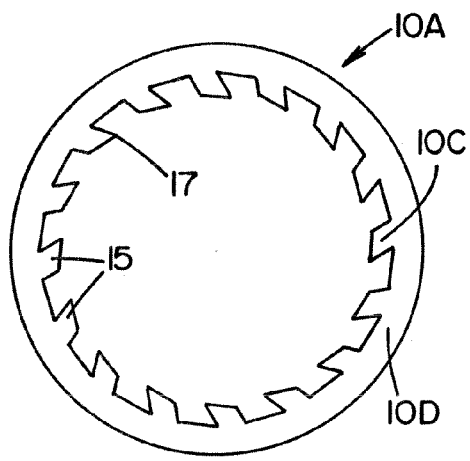
Figure 9A:
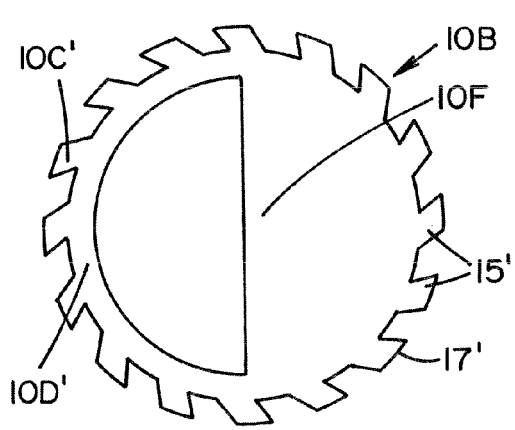
FIGS. 9A-9F show various embodiments of locking rings in an elevational view, wherein the locking rings include differently shaped, radially outer, interrupted engagement zones.
Figure 9B:
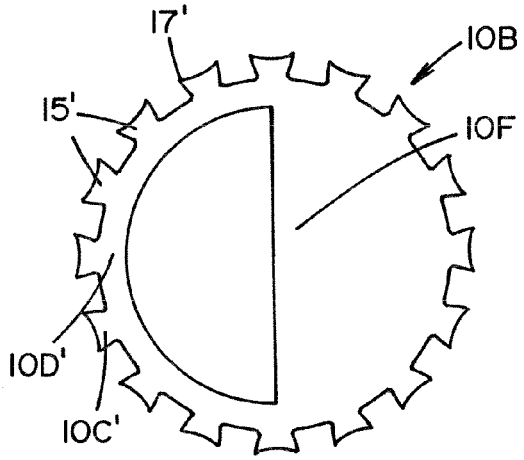
Figure 9C:
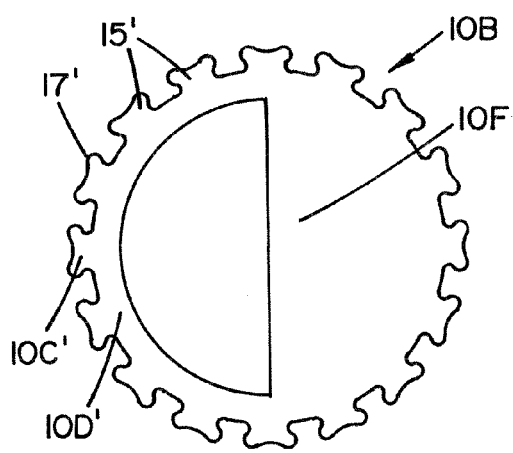
Figure 9D:
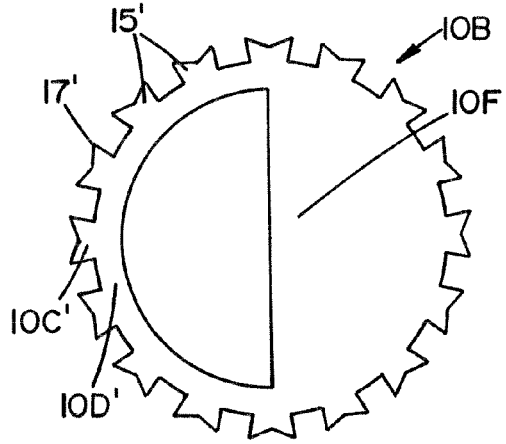
Figure 9E:
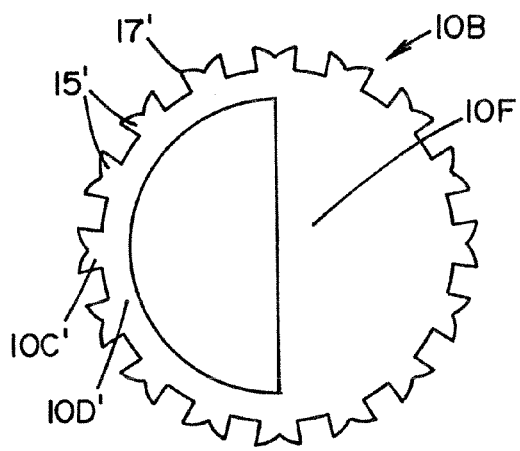
Figure 9F:
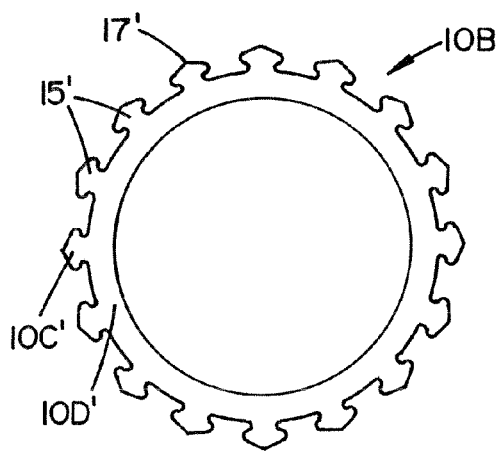
Figure 10A:
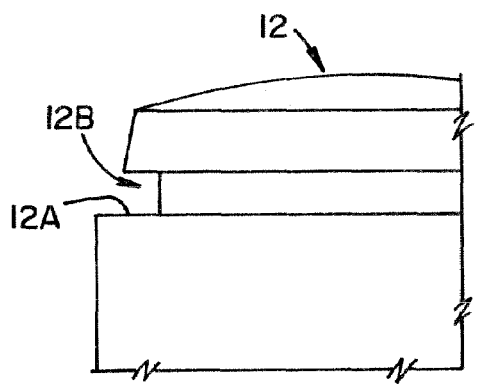
FIGS. 10A-10F show various embodiments of locking grooves in a shaft in side view, wherein the locking grooves accommodate a locking ring according to the invention; and, FIGS. 11A and 11F show various embodiments of locking grooves in a bore in elevation view partially in section, wherein the locking grooves accommodate a locking ring according to the invention.
Figure 10B:
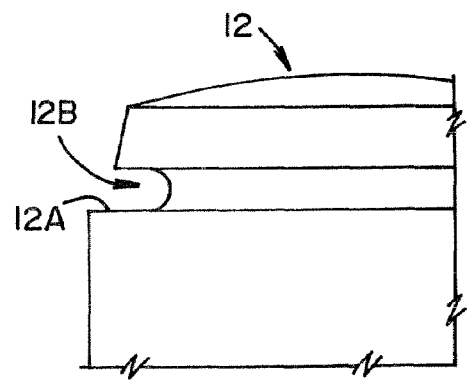
Figure 10C:
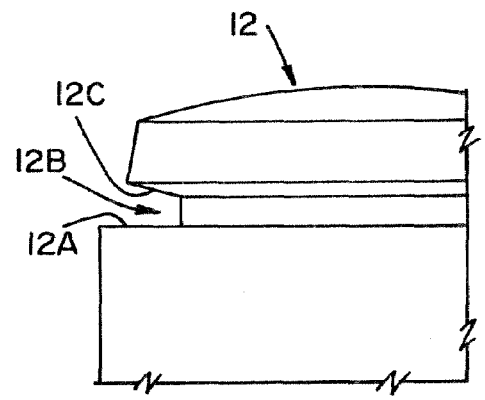
Figure 10D:
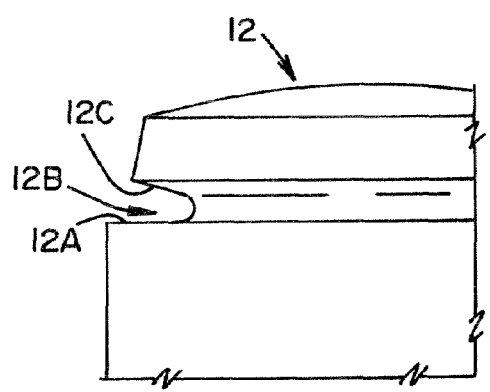
Figure 10E:
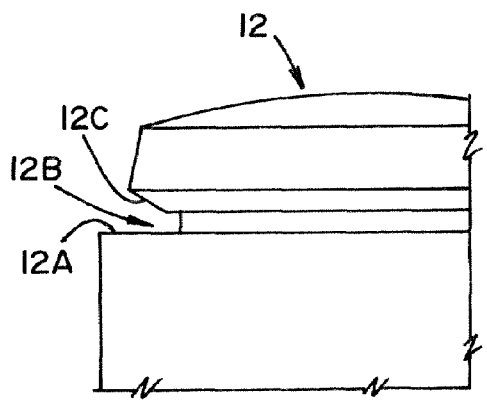
Figure 10F:
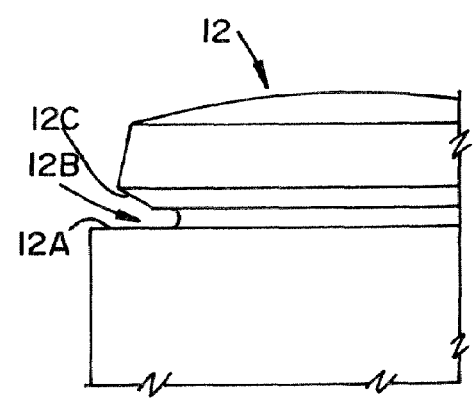
Figure 11A:
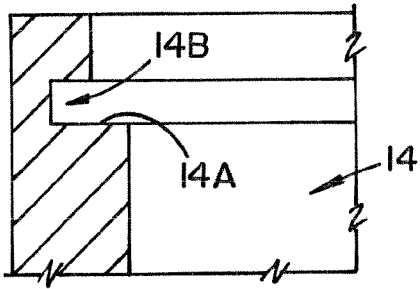
Figure 11B:
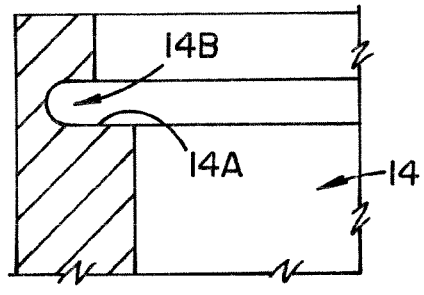
Figure 11C:
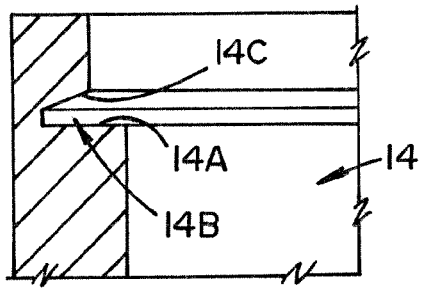
Figure 11D:
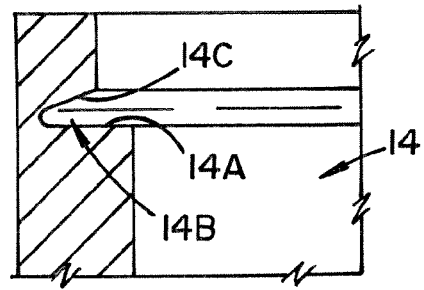
Figure 11E:
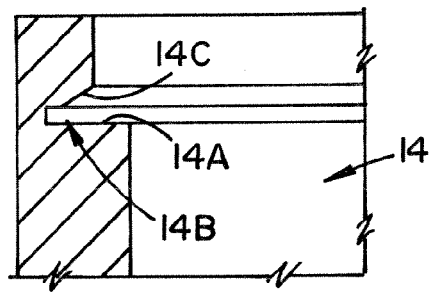
Figure 11F:
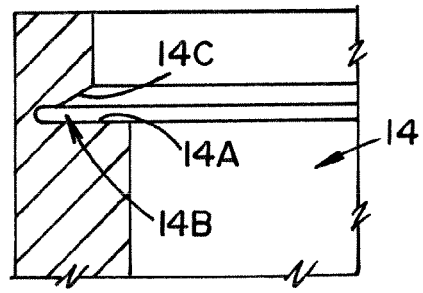

FIG. 7 shows another embodiment of this invention, where the locking ring (10A) before being installed in its final use position, is not cupped as a whole, but only the interrupted engagement zone (10C) is cupped, while the closed edge zone (10D) may be flat, slightly slanting or otherwise shaped in crossed section as shown by way of example. The use of this type of locking ring will be generally the same as described with the foregoing embodiments.

As shown in FIGS. 8A-8F and 9A-9F, the shape of the interrupted engagement zone (10C, 10C') may vary widely in order to achieve the best results for the particular application. Some of these shapes allow radial and axial movement of at least the tips (17, 17') of the teeth (15, 15') of the interrupted engagement zone (10C, 10C') so as to be firmly seated by pressing the tips (17, 17') towards the base of the locking groove (12B, 14B) of the respective shaft, shaft stub (12) or bore (14) during the bending process (plastically deforming) of the interrupted engagement zone (10C, 10C'). As will be appreciated, the embodiments of FIGS. 9A-9E each show two different varieties of locking rings, wherein left and right sides respectively include an "open" center on the left and a "closed center" (10F) on the right.

As can be seen from FIGS. 10A-10F, the locking grooves (12B) may be shaped differently in order to support a strong seat of the plastically deformed locking rings (10A), and/or to improve the plastically deforming step of the locking rings (10A) by an at least partially tapered area between its opening and its base by, for example, a conically shaped flange (12C).

As can be seen from FIGS. 11A-11F, the locking grooves (14B) may be shaped differently in order to support a strong seat of the plastically deformed locking rings (10B), and/or to improve the plastically deforming step of the locking rings (10B) by an at least partially tapered area between its opening and its base by, for example, a conically shaped flange (14C).

While the invention has been described with respect to "rings", it is to be appreciated that a broad sense of "rings" fall under the concept of this invention. For example, closed locking rings for a shaft or a shaft stub do not necessarily have to be round in their outer contour. The outer contour (rim) of the locking "ring" may include a polygon shape or any other outer shape and may be "plate like" with respect to the closed edge zone and vary widely according to the particular application. Thus, the locking rings are particularly useful for being adapted to particular mounting tasks as shown in the example of FIG. 1.

Also locking rings which are used within a bore (14) may have a shape of the closed edge zone (10D') which may vary widely and even have a closed center (10F) as shown on the right hand side in FIGS. 9A to 9E, thereby closing the bore 14. While not necessarily making this type of closure watertight, it can be useful for many types of applications where specific needs of abutment of mechanical parts against the closed edge zone (10D') is required.

REFERENCE LIST 10A locking ring
10B locking ring
10C interrupted engagement zone
10D closed edge zone
10E axis
10F closed center
11 deforming tool
11A receiving groove
11B pressing shoulder
12 shaft stub
12A support shoulder
12B locking groove
12C conical flange
13 outer rim
14 bore
14A support shoulder
14B locking groove
14C conical flange
15 teeth
16 roller
17 tip of teeth
18 needle
19 needle bearing
20 gear/swivel ring
21 inner ring area
D1 diameter of shaft stub at one side of groove
D2 diameter of shaft stub at another side of groove
D3 diameter of bottom of groove
F pressing force
I1 angle of inclination, pre-mount
I2 angle of inclination, post-mount While considerable emphasis has been placed herein on preferred embodiments of the invention, it will be appreciated that other embodiments can be devised and that many changes can be made in the preferred embodiments without departing from the principles of the invention. Accordingly, it is to be distinctly understood that the foregoing descriptive matter is to be interpreted merely as illustrative of the invention and not as a limitation.

Having thus defined the invention the following is claimed:

1. A closed locking ring for a device having a locking groove, wherein said locking ring includes an outer closed circumferentially continuous edge zone which slants at a first angle relative to a plane that is normal to the axis of said locking ring in a state prior to installation and slants at a second angle to said plane in an installed state and a radially inner circumferentially interrupted engagement zone which slants at a first angle relative to said plane that is normal to the axis of said locking ring in the state prior to installation and slants at a second angle to said plane in the installed state;
    said first angle of said outer closed edge zone being substantially the same as said first angle of said radially inner circumferentially interrupted engagement zone in the state prior to installation and said second angle of said outer closed edge zone being different from said second angle of said radially inner circumferentially interrupted engagement zone in the installed state;
    said locking ring is assembled with said device and said radially inner circumferentially interrupted engagement zone is engaged with said locking groove wherein said device is selected from the group consisting of a shaft, a shaft stub, and an axle;
    wherein in the assembled and installed state of the locking ring, at least a portion of said radially inner circumferentially interrupted engagement zone is permanently plastically deformed at a reduced angle relative to the state prior to installation wherein said second angle of said radially inner circumferentially interrupted engagement zone relative to said plane is less than said first and said second angles of said outer closed edge zone; and,
    wherein said second angle of said radially inner circumferentially interrupted engagement zone relative to said plane is less than said first angle of said radially inner circumferentially interrupted engagement zone.

2. The closed locking ring as defined in claim 1, wherein said second angle of said outer closed edge zone is about 0°-40° in the installed state of said locking ring with said locking groove.

3. The closed locking ring as defined in claim 1, wherein said second angle of said radially inner circumferentially interrupted engagement zone is between and about 0°-20° in the installed state of said locking ring with said locking groove.

4. The closed locking ring as defined in claim 1, wherein said radially inner circumferentially interrupted engagement zone is axially and radially permanently plastically deformable and thereby adjusts to said locking groove; and,
    said locking ring having a first inside diameter in the state prior to installation and a second inside diameter in the installed state, said first inside diameter greater than said second inside diameter.

5. A closed locking ring for a device having a locking groove, wherein said locking ring includes an outer closed edge zone which slants at a first angle relative to a plane that is normal to the axis of said locking ring in a state prior to installation and slants at a second angle to said plane in an installed state and a radially inner circumferentially interrupted engagement zone which slants at a first angle relative to said plane that is normal to the axis of said locking ring in the state prior to installation and slants at a second angle to said plane in the installed state, said first slanting angle of said radially inner circumferentially interrupted engagement zone being about 15°-45° in the state prior to installation of said locking ring with said locking groove;

said locking ring is assembled with said device and said radially inner circumferentially interrupted engagement zone is engaged with said locking groove wherein said device is selected from the group consisting of a shaft, a shaft stub, and an axle;

said locking ring having a first inside diameter in the state prior to installation and a second inside diameter in the installed state, said first inside diameter is different from said second inside diameter wherein in the installed state at least a portion of said radially inner circumferentially interrupted engagement zone is axially and radially permanently plastically deformed and thereby adjusts to said locking groove; and, wherein in the assembled and installed state of the locking ring, at least a portion of said radially inner circumferentially interrupted engagement zone is permanently plastically deformed at a reduced angle relative to the state prior to installation wherein said second slanting angle of said radially inner circumferentially interrupted engagement zone is less than said second slanting angle of said outer closed edge zone.

6. The closed locking ring as defined in claim 5, wherein said first slanting angle of said radially inner circumferentially interrupted engagement zone is about the same as said first slanting angle of said outer closed edge zone.

7. The closed locking ring as defined in claim 5, wherein said second slanting angle of said radially inner circumferentially interrupted engagement zone is larger than said second slanting angle of said outer closed edge zone.

8. A device having a circumferentially closed locking ring fixed axially in a groove of the device, said locking ring including an outer closed circumferentially continuous edge zone which slants at an angle relative to a plane that is normal to an axis of said locking ring and a radially inner circumferentially interrupted engagement zone which slants at an angle relative to said plane, said angle of said outer closed edge zone being substantially the same as said angle of said radially inner circumferentially interrupted engagement zone in a state prior to installation and said angle of said outer closed edge zone being different from said angle of said radially inner circumferentially interrupted engagement zone in an installed state, said device including a shaft, a shaft stub, a bore, or combinations thereof;

said locking ring is assembled with said device and said radially inner circumferentially interrupted engagement zone is engaged with said locking groove wherein said device is selected from the group consisting of a shaft, a shaft stub, and an axle;

said locking ring having a first inside diameter in the state prior to installation and a second inside diameter in the installed state, said first inside diameter is different from said second inside diameter wherein in the installed state, said radially inner circumferentially interrupted engagement zone is axially and radially permanently plastically deformed and thereby adjusts to said locking groove; and, wherein in the assembled and installed state of the locking ring, at least a portion of said radially inner circumferentially interrupted engagement zone is permanently plastically deformed at a reduced angle relative to said state prior to installation, wherein a slanting angle of said radially inner circumferentially interrupted engagement zone in said installed state is less than a slanting angle of said outer closed edge zone in said installed state and is less than a slanting angle of said radially inner circumferentially interrupted engagement zone in said state prior to installation.

9. The device locking ring as defined in claim 8, wherein said slanting angle of said outer closed edge zone is from about 0° to about 40°.

10. The device as defined in claim 8, wherein said slanting angle of said radially inner circumferentially interrupted engagement zone is from about 0° to about 20°.

11. The device as defined in claim 8, wherein the diameter of the device is larger on one side of the groove than on the other side so that an abutment or shoulder having an engagement zone is created for said radially inner circumferentially interrupted engagement zone of said locking ring.

12. The device as defined in claim 8, wherein said groove is non-rectangular shaped in cross-section.

13. The device as defined in claim 8, wherein a cross-section of said groove is tapered at least partly from its opening to its base.

14. A closed locking ring for a device having a locking groove, wherein said locking ring including an outer closed edge zone which slants at an angle relative to a plane that is normal to a central axis of said locking ring and a radially inner zone which slants at an angle to said plane, said angle of said outer closed edge zone changing from a first angle to a second angle during installation of said locking ring, said angle of said radially inner zone permanently changing from said first angle to a third angle during installation of said locking ring;

said locking ring is assembled with said device in said locking groove wherein said device is selected from the group consisting of a shaft, a shaft stub, an axle, and a bore;

said locking ring having a first diameter before installation and a second diameter after installation, said first diameter is different from said second diameter wherein after installation said radially inner zone is axially and radially permanently plastically deformed and thereby adjusts to said locking groove; and, wherein said third angle of said radially inner zone is less than said second angle of said outer closed edge zone, and said third angle of said radially inner zone is less than said first angle of said radially inner zone.

15. The closed locking ring as defined in claim 14, wherein said second angle of said outer closed edge zone is from about 0° to about 40° after installation of said locking ring with said locking groove.

16. The closed locking ring as defined in claim 14, wherein said third angle of said radially inner zone is from about 0° to about 20° after installation of said locking ring with said locking groove.

17. A closed locking ring for a device having a locking groove, wherein said locking ring includes, in a state prior to installation, an outer edge zone which slants from a plane perpendicular to the axis of said locking ring at a first angle towards the axis of said locking ring, and a radially inner zone which slants from a plane perpendicular to the axis of said locking ring at substantially the same said first angle towards the axis of said locking ring, said locking ring is assembled with said device in said locking groove wherein said device is selected from the group consisting of a shaft, a shaft stub, an axle, and a bore;

wherein said outer edge zone or said inner zone is an engagement zone for the engagement with the locking groove, and wherein a second angle of said outer edge zone is, in an installed state of the locking ring, different from a second angle of said radially inner zone in the installed state of the locking ring; and, wherein, in the assembled and installed state of the locking ring, at least a portion of said outer edge zone or said inner zone slants at a permanently plastically deformed respective said second angle towards the axis of said locking ring.

* * * * *